US006455954B1

United States Patent
Dailey

(10) Patent No.: US 6,455,954 B1
(45) Date of Patent: Sep. 24, 2002

(54) AUXILIARY POWER SUPPLY SYSTEM SERVING AS PRIMARY POWER SOURCE DURING SELECTED TIMES AND POWER OUTAGES

(75) Inventor: Christopher L. Dailey, Moyock, NC (US)

(73) Assignee: Innovations Electrical LC, Moyock, NC (US)

( * ) Notice: Subject to any disclaimer, the term of this patent is extended or adjusted under 35 U.S.C. 154(b) by 35 days.

(21) Appl. No.: 09/583,513

(22) Filed: May 31, 2000

(51) Int. Cl.[7] .................................................. H02J 7/00
(52) U.S. Cl. ............................ 307/66; 307/43; 307/52; 307/80; 307/85
(58) Field of Search .............................. 307/66, 64, 80, 307/82, 85, 43, 52, 65

(56) References Cited

U.S. PATENT DOCUMENTS

| | | | | |
|---|---|---|---|---|
| 5,458,991 A | * | 10/1995 | Severinsky | 429/61 |
| 5,483,108 A | * | 1/1996 | Girard et al. | 307/64 |
| 5,994,795 A | * | 11/1999 | Gabillet | 307/66 |

* cited by examiner

Primary Examiner—Brian Sircus
Assistant Examiner—Robert L DeBeradinis
(74) Attorney, Agent, or Firm—Peter J. Van Bergen

(57) ABSTRACT

An auxiliary power supply system serves as a consumer's primary power source during selected times and power outages in order to provide the consumer with a continuous supply of AC voltage. A power supply has a rechargeable DC source coupled to an inverter/charger circuit. A first switching means has an input port coupled to an AC voltage source and has an output port. The first switching means, programmable with at least one selected time period, couples the AC voltage source to the output port during a non-selected time period that is different than the selected time period and uncouples the AC voltage source from the output port during the selected time period. A second switching means is coupled to the output port and has a switch coupled between the output port and the inverter/charger circuit. The switch is selectively placed in one of a first position when a normal AC voltage is sensed and a second position when an inadequate AC voltage is sensed. In the first position, the switch is positioned to so that the normal AC voltage is available across the switch and is supplied to the inverter/charger circuit. In the second position, the switch is positioned to receive an AC output voltage from the inverter/charger circuit. As a result, one of the normal AC voltage and AC output voltage is available across the switch at all times.

25 Claims, 4 Drawing Sheets

AUXILIARY POWER SUPPLY SYSTEM SERVING AS PRIMARY POWER SOURCE DURING SELECTED TIMES AND POWER OUTAGES

FIELD OF THE INVENTION

The invention relates generally to auxiliary power supply systems, and more particularly to a rechargeable, auxiliary power supply system that can serve as a user's primary power source during selected (e.g., peak rate) times as well as during emergency power outages.

BACKGROUND OF THE INVENTION

Currently, most consumers purchase their electrical power from a local supplier that has purchased bulk power from generation sources. Typically, the consumer pays a rate predicated upon a rate schedule. Rates on the schedule are generally higher during "peak" time periods (e.g., periods falling between 6AM and 1PM when overall demand is higher) and lower during "off-peak" time periods (e.g., falling between 11PM and 6AM when overall demand is lower). Since most consumers use the majority of their electricity during peak time periods, most consumers pay an average rate which reflects the peak rate for the vast majority of their electrical power and are unable to avail themselves of the supplier's off-peak rate.

A separate problem that consumers experience with respect to electrical power is the loss of that power due to the supplier's hardware or software failure in the event of weather problems, system problems, etc. The consumer generally has no warning that a power outage is about to occur. Furthermore, the consumer generally has no idea how long a power outage will last. Since today's society is so dependent on electrical power, the loss of electricity has a huge impact on each consumer. From maintaining indoor temperatures for cooling, to keeping home/business computers, phones and other appliances powered, nearly every indoor activity relies on the use of electricity in some way. Accordingly, many consumers are purchasing gasoline-powered AC generators as an emergency substitute for electric power during a power outage. However, these generators have their own drawbacks associated therewith. They are noisy, must be manually turned on when needed, and require manual refilling with fuel.

SUMMARY OF THE INVENTION

Accordingly, it is an object of the present invention to provide a system that allows a consumer to avail themselves of an electrical power supplier's best rate.

Another object of the present invention is to provide a system that continuously supplies electrical power to a user even when the consumer's electrical supplier has a power outage problem.

Still another object of the present invention is to provide the consumer with a means to cope with extended power outages without the loss of use of most or all of their electrical appliances/systems.

Yet another object of the present invention is to provide a system that allows the consumer to avail themselves of an electrical supplier's best rate, automatically and seamlessly assures the consumer of a supply of electrical power during a power outage, and is easily added to a consumer's existing electrical infrastructure.

Other objects and advantages of the present invention will become more obvious hereinafter in the specification and drawings.

In accordance with the present invention, a system provides a continuous supply of AC voltage. A power supply has a rechargeable DC source (e.g., batteries) coupled to an inverter/charger circuit that can convert a supplied AC voltage to a DC voltage to charge the batteries, and that can convert a DC output voltage from the batteries to an AC output voltage upon discharge of the batteries. A first switching means has an input port coupled to an AC voltage source and has an output port. The first switching means, programmable with at least one selected time period, couples the AC voltage source to the output port during a non-selected time period that is different than the selected time period and uncouples the AC voltage source from the output port during the selected time period. A second switching means is coupled to the output port for sensing thereon one of a normal AC voltage and an inadequate AC voltage. The second switching means has a switch coupled between the output port and the inverter/charger circuit. The switch is selectively placed in one of a first position when the normal AC voltage is sensed and a second position when the inadequate AC voltage is sensed. In the first position, the switch is positioned to so that the normal AC voltage is available across the switch and is supplied to the inverter/charger circuit as the supplied AC voltage. In the second position, the switch is positioned to receive the AC output voltage from the inverter/charger circuit as the DC batteries discharge. The AC output voltage from the inverter/charger circuit is available across the switch. As a result, one of the normal AC voltage and AC output voltage is available across the switch at all times. One or more loads can be coupled to the switch.

BRIEF DESCRIPTION OF THE DRAWINGS

Do Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
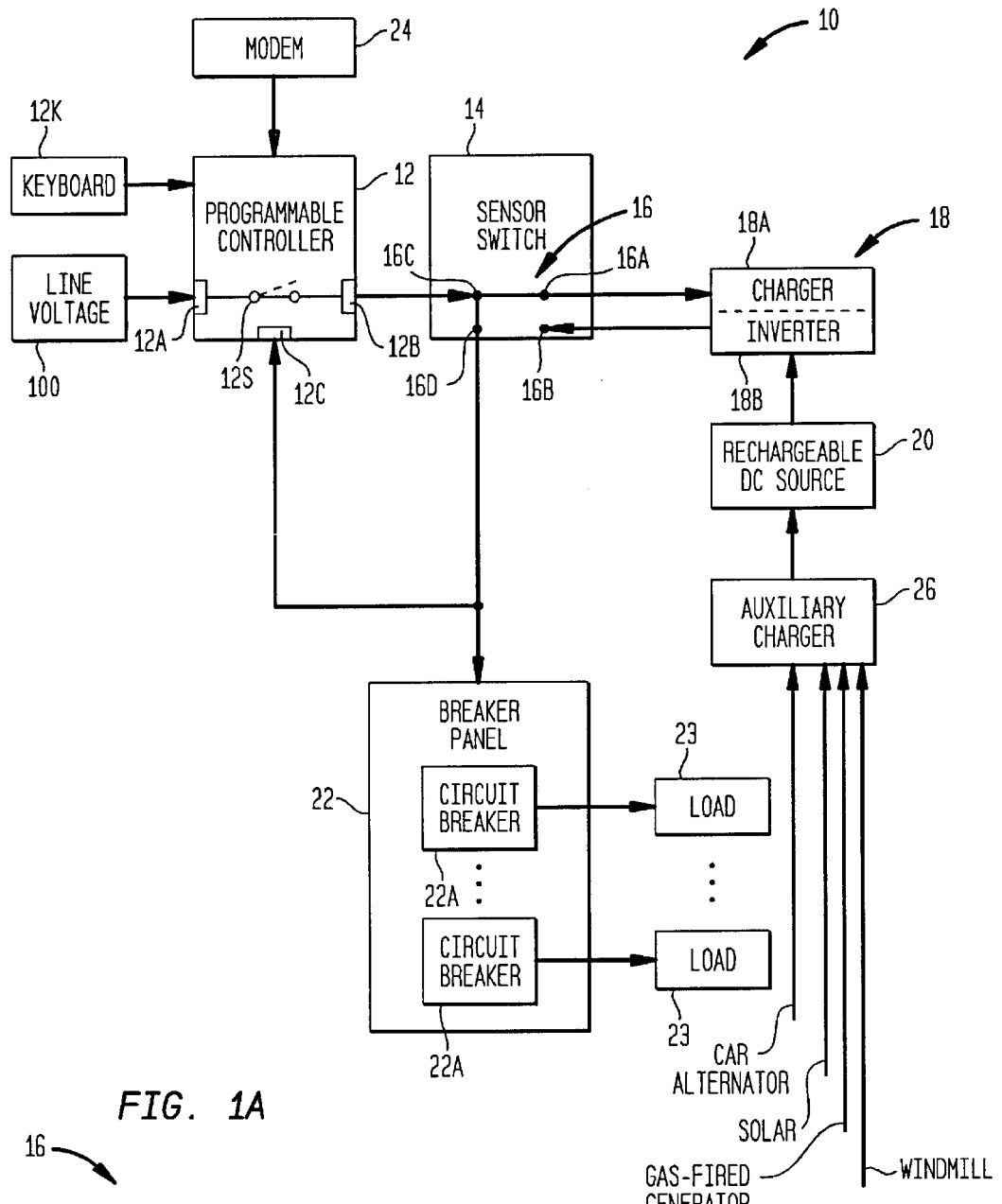
FIG. 1 is a top-level schematic diagram of an embodiment of the programmable, rechargeable power supply system that serves as a consumers primary power source during selected and emergency times in accordance with the present invention.

Referring now to the drawings and more particularly to FIG. 1, one embodiment of a continuous-supply, programmable and rechargeable power supply system is shown and referenced generally by numeral 10. System 10 can serve as a consumer's primary power source during both selected times and times of emergency without disrupting operation at any of a plurality of selected loads. Since alternating current (AC) voltage is the supply standard, the present invention provides a continuous supply of AC voltage. However, it is to be understood that the present invention could also be used in an entirely DC voltage scenario.

System 10 is coupled to an AC voltage source such as a power utility's line voltage 100. In a typical installation of system 10, line voltage 100 would be made available by connection to the line voltage line/terminal at a consumer's main breaker panel (not shown). Line voltage 100 is coupled to an input port 12A of a programmable controller 12 having the capability to selectively couple/uncouple line voltage 100 therethrough to an output port 12B. Coupled to output port 12B is a sensor switch 14 having the capability of sensing voltage at output port 12B and positioning an internal switch predicated on the voltage sensed. Such sensor switches are well known in the art and are available commercially from, for example, Mastervolt, Amsterdam, The Netherlands, and Heart Interface Corporation, Kent, Wash.

One side of switch 16 is coupled to a rechargeable power supply that includes an inverter/charger circuit 18 and a rechargeable DC source 20. More specifically, contact 16A of switch 16 is coupled to the charger portion 18A of circuit 18, while contact 16B is coupled to the inverter portion 18B of circuit 18. Charger portion 18A supplies a charging voltage to rechargeable DC source 20 while inverter portion 18B receives a discharging voltage from rechargeable DC source 20 and converts same to an AC output voltage available at contact 16B. Such inverter/charger circuits 18 are well known in the art and will, therefore, not be described in further detail. Inverter/charger circuits are available commercially from, for example, Heart Interface Corporation, Kent, Wash., and Trace Engineering, Arlington, Wash.

Rechargeable DC source 20 can be one or more DC batteries having deep cycle capabilities. Such deep cycle batteries can be of the lead-acid or gel cell type. Note that for interior installations, gel cell batteries are preferred since they do not present any toxic leak problems.

Contact 16C of switch 16 is coupled to output port 12B and through contact 16D to one or more loads. Contact 16D is also coupled to programmable controller 12. Specifically, contact 16D is coupled to a power port 12C of programmable controller 12 that provides the operating voltage therefor.

The loads coupled to contact 16D are typically coupled via a breaker panel 22 that houses a plurality of circuit breakers 22A coupled to selected loads 23. The choices for selected loads 23 can be hardwired or can be selected through a continual load balance analysis that will, for example, use power from rechargeable DC source 20 along with line voltage 100 in order to prevent spikes in the consumer's usage of line voltage 100 at all times. Programmable controller 12 could be used to perform such a load balance analysis, and could be used to selectively couple line voltage 100 and/or rechargeable DC source 20 (to loads 23) to maintain the most economical load balance. In terms of hardwiring selected loads 23, a preliminary load balance analysis is performed to determine which of a consumer's loads can be adequately supplied by rechargeable DC source 20 during "on peak" times or during power outages.

System 10 can also include a remote communication device such as a modem 24 coupled to programmable controller 12 for the purpose of enabling the remote programming of controller 12 as will be explained further below. System 10 could also include an auxiliary charger 26 coupled directly to rechargeable DC source 20. Charger 26 can be an AC-to-DC or DC-to-DC charger based on the type of power source used which could include an automobile alternator, a gasoline generator, a solar source, a windmill, etc. Auxiliary charger 26 provides for the recharging of rechargeable DC source 20 during times of extended power outages.

System 10 is predicated on the reality that most consumers rely on line voltage 100 as their sole source of electrical power. As a result of this fact, consumers are totally reliant on the supplying utility's reliability and costing structure that prices power higher or lower depending on the time of the day. In addition, many utilities vary a consumer's rate based on the consumer's peak usage with a higher peak usage causing all of a consumer's usage to be billed at a higher rate. For example, many households peak in energy usage early in the morning when members of the household start their day. If this "spike" in energy usage is used to set a consumer's rate, the consumer will pay this higher rate for all of a billing cycle even though most of the consumer's usage falls far below the more expensive "spike" rate.

For purpose of illustration, it will be assumed that the supplier of line voltage 100 charges a lower ("off peak") rate between the hours of 11PM and 6AM, and charges a higher ("on peak") rate between the hours of 6AM and 11PM. It is to be understood that this simple "off peak"/"on peak" schedule could be more complex with several off/on peak times, and with differentiation between weekdays and weekend days.

Programmable controller 12 is programmed locally/manually via keyboard 12K or remotely via modem 24 with the "off peak" time(s). In addition to being programmed with times, programmable controller 12 can also be programmed with a calendar so that system 10 can distinguish between weekdays and weekend days in order to take advantage of different rate schedules that may be associated therewith. During the "off peak" times, an internal switch 12S is maintained in a closed position (as shown) to coupled line voltage 100 to output port 12B. Sensor switch 14 senses the voltage on output port 12B and positions its internal switch 16 accordingly. For example, during an "off peak" time with switch 12S closed, sensor switch 14 will sense one of a normal AC voltage or an inadequate AC voltage. That is, a normal AC voltage is indicative of good line voltage and an inadequate AC voltage is indicative of too little or no line voltage due to a line problem such as a power shortage or outage. When a normal AC voltage is sensed, internal switch 16 couples contact 16C to contacts 16D and 16A so that the normal AC voltage is available across switch 16 and supplied to charger portion 18A. The normal AC voltage is converted to DC by charger portion 18A and supplied to rechargeable DC source 20. The normal AC voltage at contact 16D is also provided to loads 23 and to power port 12c.

Figure 1A:
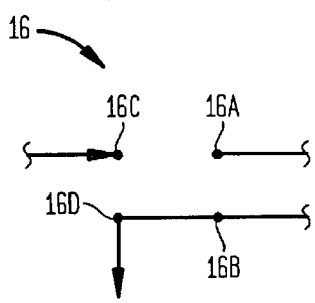
FIG. 1A is an isolated schematic view of the sensor switch's internal switch when an inadequate AC voltage is sensed.

If an inadequate AC voltage is sensed during an "off peak" time when switch 12S is closed, internal switch 16 couples contact 16D to 16B and uncouples contact 16C from contacts 16A and 16D as illustrated in FIG. 1A. As a result, rechargeable DC source 20 begins to discharge through inverter portion 18B so that an AC output voltage (i.e., a normal AC voltage suitable for use by loads 23) is made available across switch 16 for supply to loads 23 and power port 12C. Similarly, during the higher-rate "on peak" time (s), programmable controller 12 opens switch 12S so that sensor switch 14 again senses an inadequate AC voltage at output port 12B. As a result, internal switch 16 is positioned as it would be for a power outage, i.e., contact 16D is coupled to 16B while contact 16C is uncoupled from contacts 16A and 16D as in FIG. 1A, so that rechargeable DC source 20 discharges through inverter portion 18B.

In the present invention, loads 23 and power port 12C are continually supplied with either the normal AC voltage supplied by line voltage 100 or the AC output voltage supplied by inverter portion 18B. This allows the internal clock (not shown) and programming of programmable controller 12 to be maintained at all times. Thus, even in a power outage, programmable controller 12 operates according to its programmed schedule in terms of closing/opening switch 12S. This feature prevents unscheduled changes in switch 12S which, in turn, could result in a consumer's peak time usage to be supplied directly by line voltage 100 in stead of rechargeable DC source 20. If this were to occur, a consumer's "spike" in peak time usage could result in the utility applying a higher rate to all of the consumer's energy use as explained above.

Figure 2:
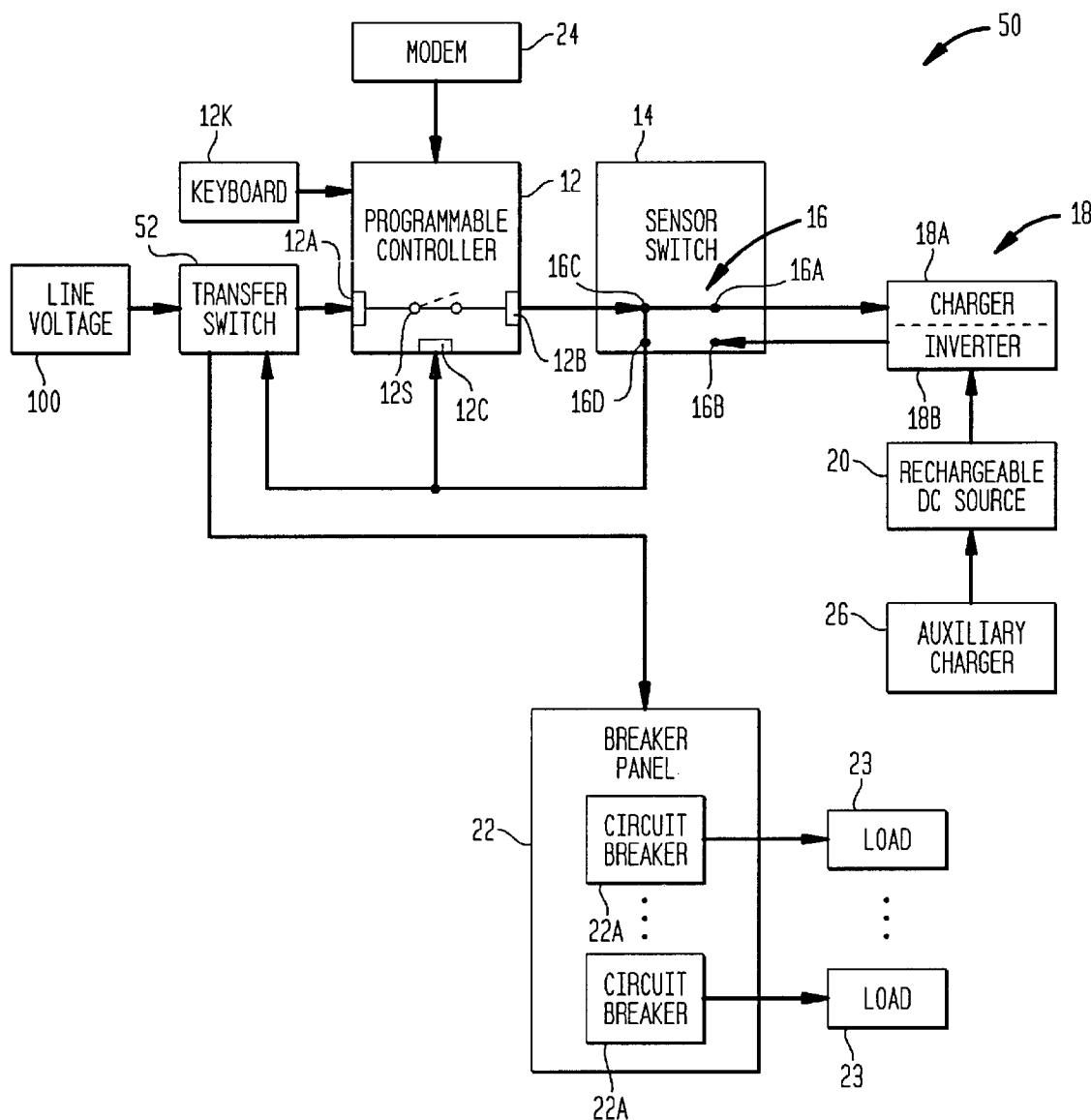
FIG. 2 is a top-level schematic of another embodiment of the present invention that includes a front-end manually-operated transfer switch for coupling or uncoupling the present invention from selected loads.
Figure 3A:
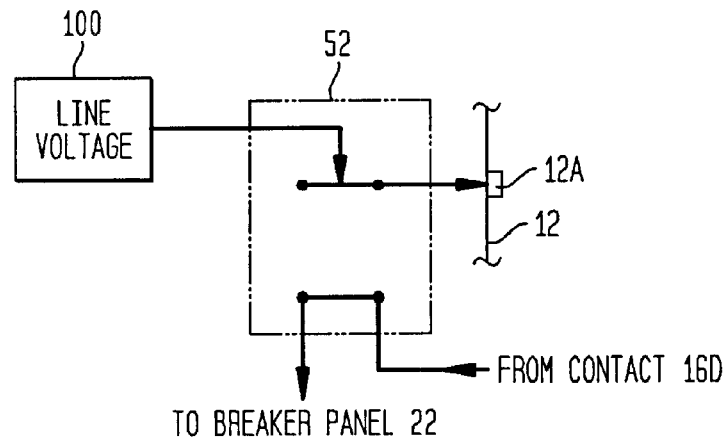
FIG. 3A is a schematic of the transfer switch when the present invention is coupled to selected loads.
Figure 3B:
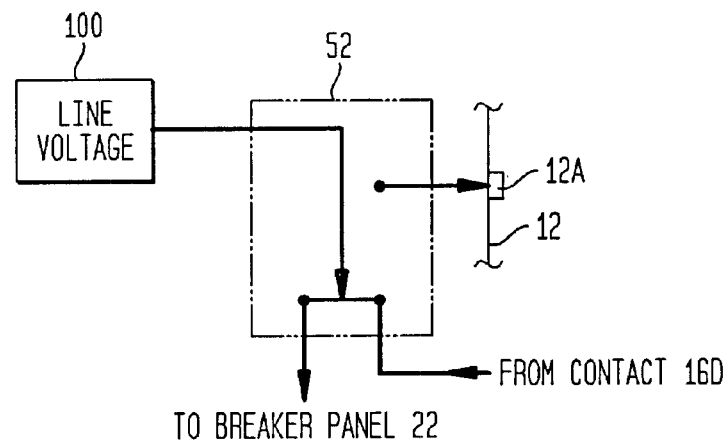
FIG. 3B is a schematic of the transfer switch when the present invention is being bypassed and AC line voltage is being supplied directly to selected loads.
Figure 3C:
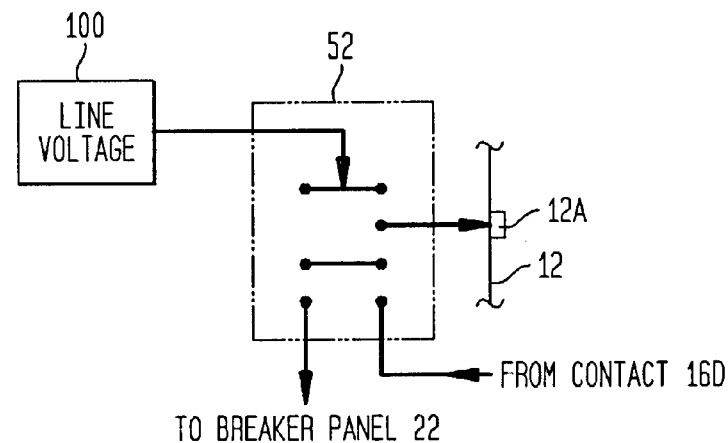
FIG. 3C is a schematic of the transfer switch when both the present invention and AC line voltage are uncoupled from selected loads.

The present invention could also include a front-end transfer switch 52 which is illustrated as part of a system 50 in FIG. 2. The same reference numerals are used for those elements common to system 10. Transfer switch 52 allows a consumer and/or technician to override the present invention, put it on-line, or disconnect power completely from loads that is, switch contact 16D is coupled to breaker panel 22 through transfer switch 52. The possible positions of transfer switch 52 are illustrated in FIGS. 3A, 3B and 3C. FIG. 3A depicts the on-line position where line voltage 100 is coupled to programmable controller 12, and a closed circuit couples contact 16D of internal switch 16 to breaker panel 22. FIG. 3B depicts the override position where line voltage 100 is uncoupled from programmable controller 12 and is instead coupled directly to breaker panel 22. Note that in this position transfer switch 52 also supplies line voltage 100 to power port 12C of programmable controller 12. FIG. 3C depicts the off-line position where line voltage 100 is uncoupled from programmable controller 12 and the circuit coupling contact 16D to breaker panel 22 is opened.

Figure 4:
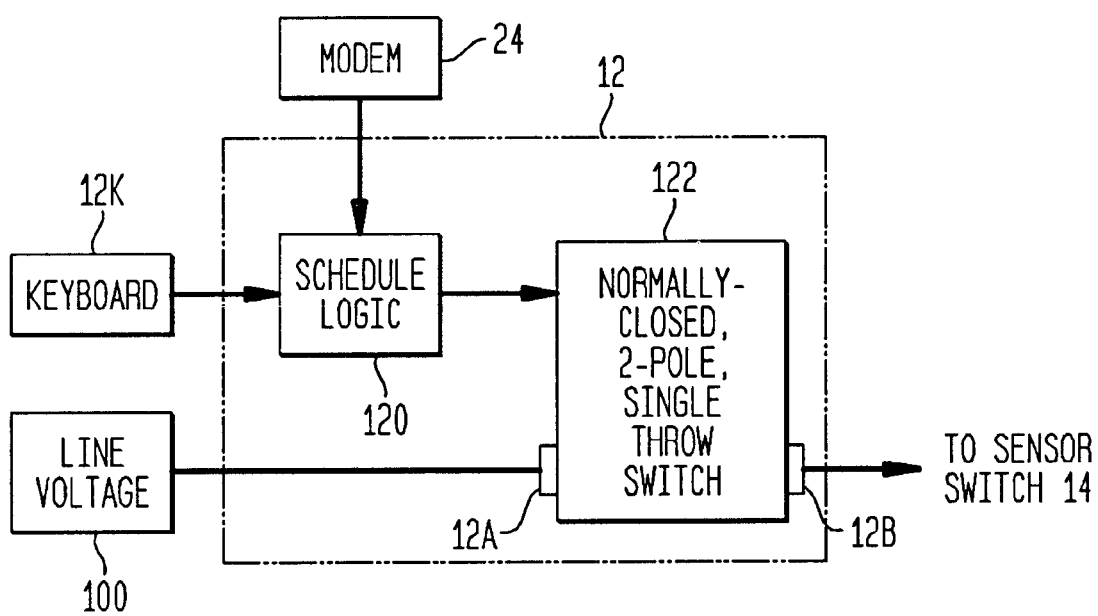
FIG. 4 is a schematic of an embodiment of a programmable controller used in the present invention.

FIG. 4 illustrates an embodiment of programmable controller 12 suitable for handling the hardwired selection of selected loads 23. A device programmed with schedule logic 120 is powered continually as it is coupled to power port 12C. Schedule logic 120 can be programmed with well known logic languages such as LONWORKS. The selected time or times indicative of lower utility rates are programmed using either keyboard 12K or modem 24. Based on the time of day and programmed schedule, schedule logic 120 issues a control signal to a normally-closed, two-pole single throw switch 122. Switch 122 is available from a variety of commercial sources such as, for example, Square D Company, Mechanicsburg, Pa. During off-peak times, switch 122 is maintained in its normally-closed position where ports 12A and 12B are coupled to one another. Thus, when line voltage 100 is a good line voltage, a normal AC voltage appears at port 12B and during a power problem, an inadequate AC voltage appears at port 12B. During scheduled times, switch 122 can be opened so that no AC voltage appears at port 12B.

The advantages of the present invention are numerous. A consumer can avail himself of a utility company's best "off-peak" rate at all times of the day. Further, the present invention can be used to keep the consumer's usage from spiking during the more expensive "on peak" portions of the day. Still further, the present invention provides a seamless and automatic transfer of power to a rechargeable DC source during times of power outage. The present invention can also sustain a consumer during extended power outages by providing for auxiliary charging of its rechargeable DC source.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for continuous supply of AC voltage, comprising:

a power supply including rechargeable DC batteries coupled to an inverter/charger circuit that converts a supplied AC voltage to a DC voltage to charge said DC batteries, and that converts a DC output voltage from said DC batteries to an AC output voltage when said DC batteries are discharging;

first means having an input port coupled to an AC voltage source and having an output port, said first means being programmable with at least one selected time period, said first means coupling said AC voltage source to said output port during a non-selected time period that is different than said selected time period and said first means uncoupling said AC voltage source from said output port during said selected time period; and second means coupled to said output port for sensing thereon one of a normal AC voltage and an inadequate AC voltage, said second means including a switch coupled between said output port and said inverter/charger circuit for selectively being placed in one of a first position when said normal AC voltage is sensed and a second position when said inadequate AC voltage is sensed wherein, in said first position, said switch is positioned to supply said normal AC voltage to said inverter/charger circuit as said supplied AC voltage wherein said normal AC voltage is available across said switch, and wherein, in said second position, said switch is positioned to receive said AC output voltage from said inverter/charger circuit as said DC batteries discharge wherein said AC output voltage is available across said switch, and wherein one of said normal AC voltage and said AC output voltage is available across said switch.

2. A system as in claim 1 wherein said first means is coupled to said switch, wherein said first means is continuously powered by one of said normal AC voltage and said AC output voltage.

3. A system as in claim 1 further comprising a plurality of circuit breakers coupled to said switch wherein one of said normal AC voltage and said AC output voltage is coupled to said plurality of circuit breakers.

4. A system as in claim 1 further comprising at least one auxiliary charging circuit coupled directly to said DC batteries for coupling an auxiliary source of current to said DC batteries for charging said DC batteries.

5. A system as in claim 4 wherein said auxiliary source is a DC source, and wherein said auxiliary charging circuit is a DC-to-DC charging circuit.

6. A system as in claim 4 wherein said auxiliary source is an AC source, and wherein said auxiliary charging circuit is an AC-to-DC charging circuit.

7. A system as in claim 1 wherein said DC batteries comprise at least one deep cycle battery.

8. A system as in claim 1 further comprising a modem coupled to said first means for enabling remote programming of said at least one selected period of time.

9. A system as in claim 3 further comprising third means coupled between said AC voltage source and said first means for selectively uncoupling said AC voltage source from said first means and coupling said AC voltage source to said plurality of circuit breakers.

10. A system for continuous supply of AC voltage, comprising:
   a rechargeable DC source;
   an inverter/charger circuit coupled to said rechargeable DC source for converting a supplied AC voltage to a DC voltage when said rechargeable DC source is charging, and for converting a DC output voltage from said rechargeable DC source to an AC output voltage when said rechargeable DC source is discharging;
   a programmable controller having an input port coupled to an AC voltage source and having an output port, said programmable controller being programmed with at least one selected time period, said programmable controller coupling said AC voltage source to said output port during a non-selected time period that is different than said selected time period and uncoupling said AC voltage source from said output port during said selected time period;
   a sensor coupled to said output port for sensing thereon one of a normal AC voltage and an inadequate AC voltage;
   a switch operably coupled to and controlled by said sensor, said switch coupled between said output port and said inverter/charger circuit for selectively being placed in one of a first position when said normal AC voltage is sensed by said sensor and a second position when said inadequate AC voltage is sensed by said sensor wherein, in said first position, said switch is positioned to supply said normal AC voltage to said inverter/charger circuit as said supplied AC voltage wherein said normal AC voltage is available across said switch, and wherein, in said second position, said switch is positioned to receive said AC output voltage from said inverter/charger circuit as said rechargeable DC source discharges wherein said AC output voltage is available across said switch, and wherein one of said normal AC voltage and said AC output voltage is available across said switch; and
   said programmable controller having a power port for receiving a required operating voltage, said power port being coupled to said switch to receive one of said normal AC voltage and said AC output voltage.

11. A system as in claim 10 wherein said rechargeable DC source comprises at least one deep cycle battery.

12. A system as in claim 10 further comprising a breaker panel having a plurality of circuit breakers coupled to said switch wherein one of said normal AC voltage and said AC output voltage is coupled to said plurality of circuit breakers.

13. A system as in claim 10 further comprising at least one auxiliary charging circuit coupled directly to said rechargeable DC source for coupling an auxiliary source of current to said rechargeable DC source for charging said rechargeable DC source.

14. A system as in claim 13 wherein said auxiliary source is a DC source, and wherein said auxiliary charging circuit is a DC-to-DC charging circuit.

15. A system as in claim 13 wherein said auxiliary source is an AC source, and wherein said auxiliary charging circuit is an AC-to-DC charging circuit.

16. A system as in claim 10 further comprising a modem coupled to said programmable controller for enabling remote programming of said at least one selected period of time.

17. A system as in claim 12 further comprising means coupled between said AC voltage source and said programmable controller, and coupled between said switch and said plurality of circuit breakers, said means operable to couple said AC voltage source to said programmable controller while coupling said switch to said plurality of circuit breakers, said means further being operable to uncouple said AC voltage source from said programmable controller while coupling said AC voltage source to said plurality of circuit breakers.

18. A system for continuous supply of AC voltage, comprising:
   a rechargeable DC source;
   an inverter/charger circuit coupled to said rechargeable DC source for converting a supplied AC voltage to a DC voltage when said rechargeable DC source is charging, and for converting a DC output voltage from said rechargeable DC source to an AC output voltage when said rechargeable DC source is discharging;
   a logic device programmed with at least one selected time period;
   a first switch operably coupled to and controlled by said logic device, said first switch having an input port coupled to an AC voltage source and having an output port, said first switch controlled by said logic device to couple said AC voltage source to said output port during any non-selected time period that is different than said selected time period and to uncouple said AC voltage source from said output port during said selected time period;
   a sensor coupled to said output port for sensing thereon one of a normal AC voltage and an inadequate AC voltage;
   a second switch operably coupled to and controlled by said sensor, said second switch coupled between said output port and said inverter/charger circuit for selectively being placed in one of a first position when said normal AC voltage is sensed by said sensor and a second position when said inadequate AC voltage is sensed by said sensor wherein, in said first position, said second switch is positioned to supply said normal AC voltage to said inverter/charger circuit as said supplied AC voltage wherein said normal AC voltage is available across said second switch, and wherein, in said second position, said second switch is positioned to receive said AC output voltage from said inverter/charger circuit as said rechargeable DC source discharges wherein said AC output voltage is available across said second switch, and wherein one of said normal AC voltage and said AC output voltage is available across said second switch; and
   said logic device coupled to said second switch wherein said logic device is powered by one of said normal AC voltage and said AC output voltage.

19. A system as in claim 18 wherein said rechargeable DC source comprises at least one deep cycle battery.

20. A system as in claim 18 further comprising a breaker panel having a plurality of circuit breakers coupled to said second switch wherein one of said normal AC voltage and said AC output voltage is coupled to said plurality of circuit breakers.

21. A system as in claim 18 further comprising at least one auxiliary charging circuit coupled to said rechargeable DC source for coupling an auxiliary source of current to said rechargeable DC source for charging said rechargeable DC source.

22. A system as in claim 21 wherein said auxiliary source is a DC source, and wherein said auxiliary charging circuit is a DC-to-DC charging circuit.

23. A system as in claim 21 wherein said auxiliary source is an AC source, and wherein said auxiliary charging circuit is an AC-to-DC charging circuit.

24. A system as in claim 18 further comprising a modem coupled to said logic device for enabling remote programming of said at least one selected period of time.

25. A system as in claim 20 further comprising means coupled between said AC voltage source and said first switch, and coupled between said second switch and said plurality of circuit breakers, said means operable to couple said AC voltage source to said first switch while coupling said second switch to said plurality of circuit breakers, said means further being operable to uncouple said AC voltage source from said first switch while coupling said AC voltage source to said plurality of circuit breakers.

* * * * *